United States Patent
Fang

[11] Patent Number: 5,200,587
[45] Date of Patent: Apr. 6, 1993

[54] INDUCTION HEATING COIL WITH CONICAL BASE

[75] Inventor: Jin-Liou Fang, San Jose, Calif.
[73] Assignee: FMC Corporation, Chicago, Ill.
[21] Appl. No.: 600,900
[22] Filed: Oct. 22, 1990
[51] Int. Cl.⁵ .................................................. H05B 6/40
[52] U.S. Cl. .................................. 219/10.53; 219/10.73; 219/10.79; 156/69; 156/274.2; 156/380.6
[58] Field of Search ............... 219/10.53, 10.73, 10.79, 219/10.67; 156/69, 272.4, 274.2, 379.7, 380.2, 380.6

[56] References Cited
U.S. PATENT DOCUMENTS

| | | | |
|---|---|---|---|
| 3,632,943 | 1/1972 | Engler | 219/10.79 |
| 4,478,669 | 10/1984 | Zeller et al. | 219/10.53 |
| 4,539,456 | 9/1985 | Mohr | 219/10.53 |
| 4,571,472 | 2/1986 | Pollack et al. | 219/10.53 X |
| 4,707,213 | 11/1987 | Mohr et al. | 156/380.2 |
| 4,994,637 | 2/1991 | Fang et al. | 219/10.53 |
| 5,047,605 | 9/1991 | Ogden | 219/10.73 |

Primary Examiner—Philip H. Leung
Attorney, Agent, or Firm—Michael Lee; R. C. Kamp

[57] ABSTRACT

An induction heating coil with a conical base for fusing a plastic lid to a plastic container. A generally cylindrical container is placed in a generally cylindrical hollow nest having a conical upper wall portion. A plastic lid having a metallic layer is placed on an upper portion of the container. A portion of the lid and a portion of the container are pressed together between the conical wall and the conical coil base during a fusing operation. Container and lid are formed by pressure and heat to provide a uniform seal.

9 Claims, 2 Drawing Sheets

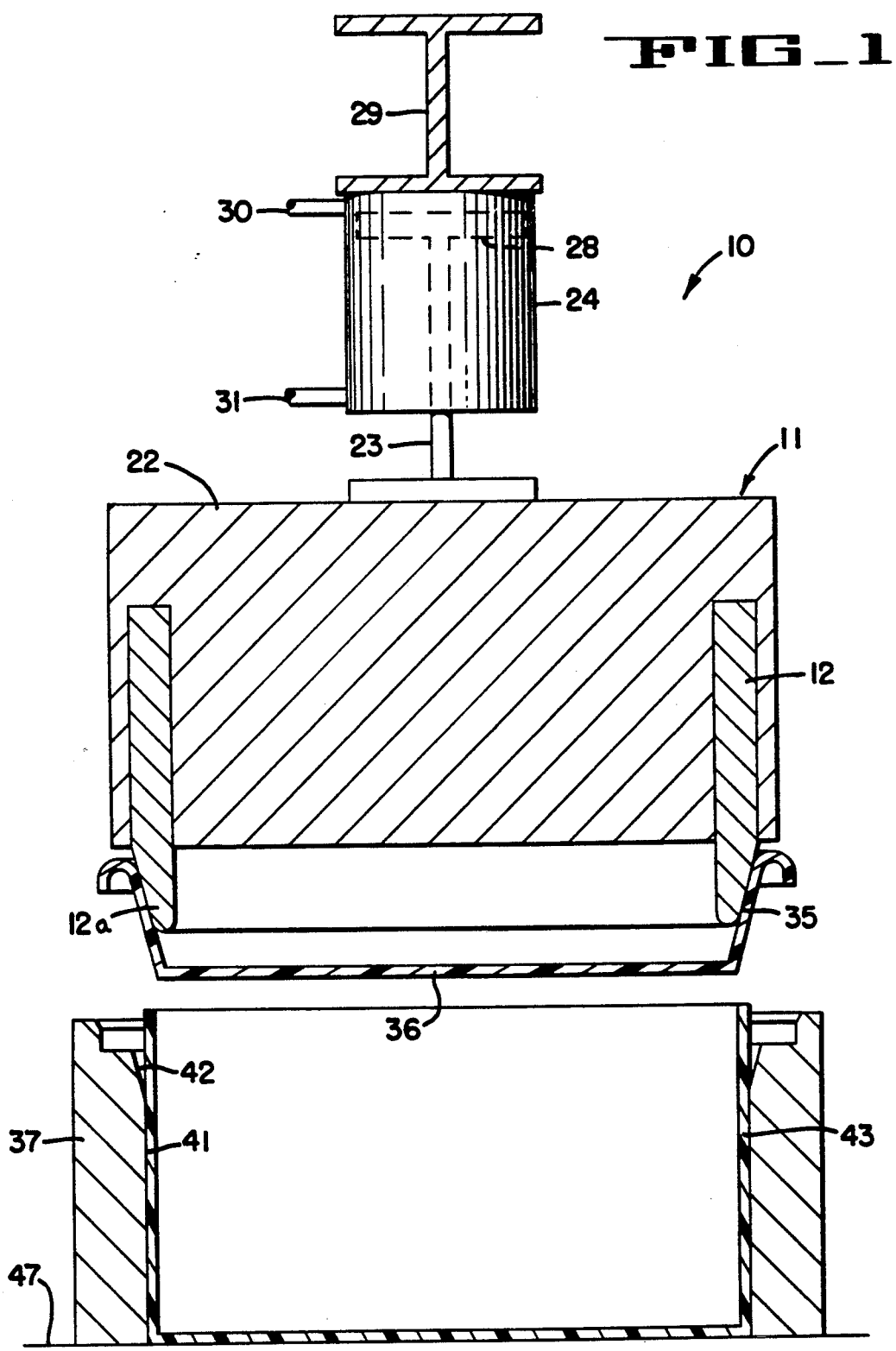

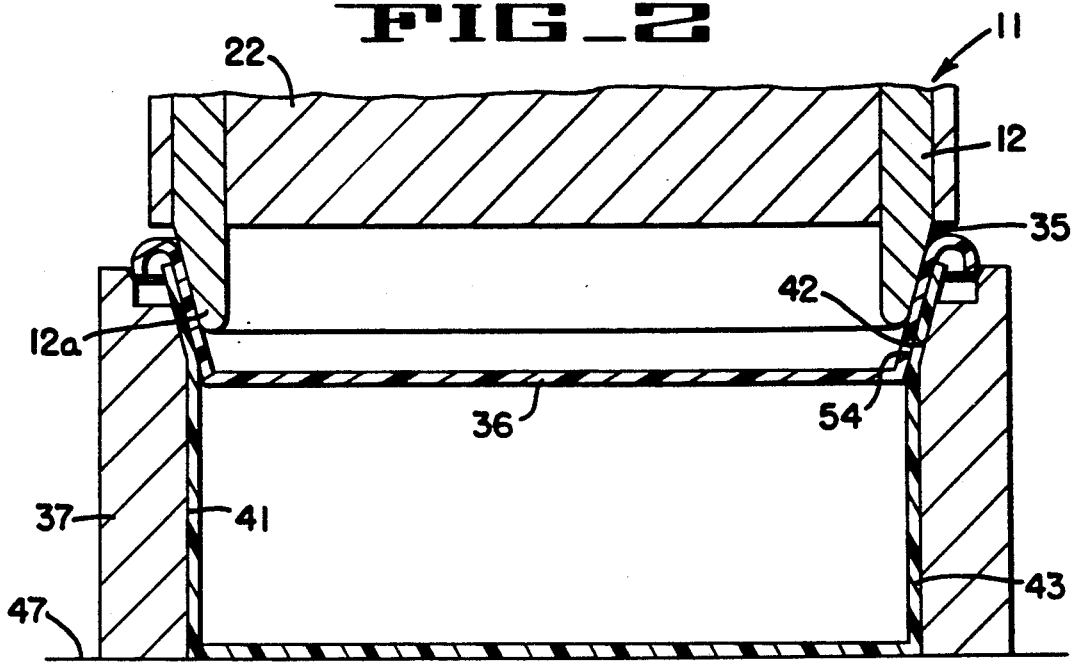
FIG_2
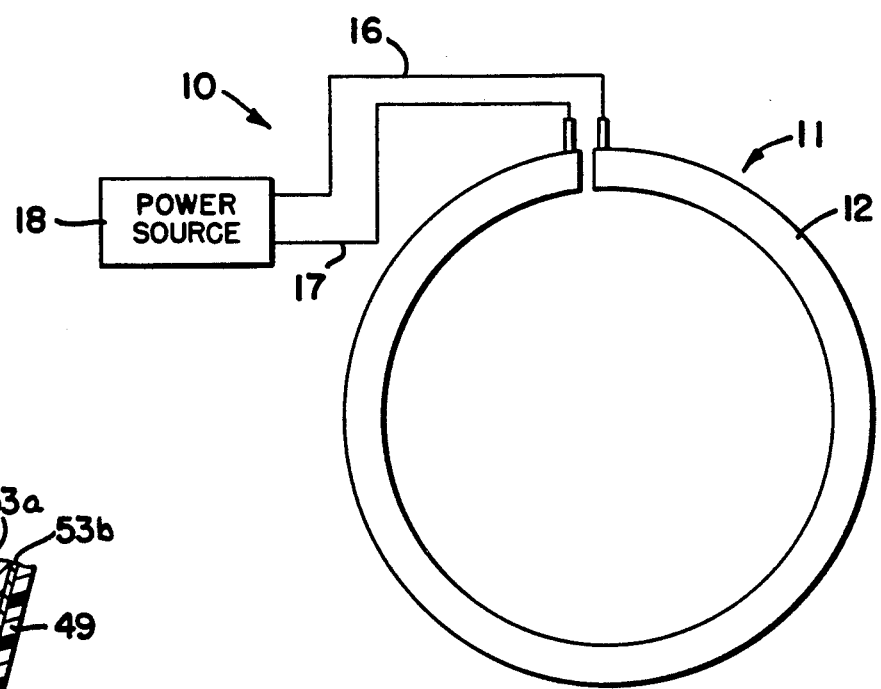
FIG_3
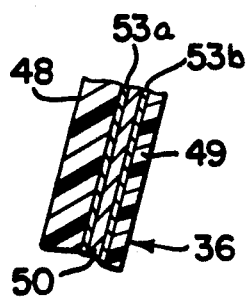
FIG_4

INDUCTION HEATING COIL WITH CONICAL BASE

BACKGROUND OF THE INVENTION

The present invention relates to induction heating coils, and more particularly, to an induction heating coil having a conical base which forms a portion of a container to mate with the shape of a lid for uniform sealing of a lid to a food container.

Plastic containers are commonly used for the packaging of food and for a wide variety of other items wherein a plastic lid is bound to a plastic container by the application of heat. A commonly used method of bonding involves the use of a laminated plastic lid having a layer of metal foil. A power supply provides an oscillating electrical current to a nearby induction coil which induces an electrical current into the metal foil to develop heat. The heat melts portions of the lid and container and fused the lid to the container. A pressing cone mounted between the induction coil and the lid presses a portion of the lid against a portion of the container during the fusing of the lid to the container.

SUMMARY OF THE INVENTION

The present invention discloses an induction heating apparatus using a single turn coil assembly to seal a plastic lid to a generally cylindrical container. The container is placed in a general cylindrical hollow nest with the nest having a generally conical upper wall portion. A lower portion of an induction coil has a generally conical shape. A plastic lid having a layer of metallic material is placed on an upper portion of the container. A portion of the lid and a portion of the container are pressed between the conical portions of the induction coil and the conical portion of the wall of the nest while an electrical current is provided to the coil. The pressed portions of the lid and container are formed in a conical shape and fused together to provide a uniform seal.

BRIEF DESCRIPTION OF THE DRAWINGS

FIG. 1 is a sectional view of a coil assembly with the induction coil of the present invention having a conical coil base and with the container nest having a conical shaped wall portion.

FIG. 2 is a portion of the sectional view of FIG. 1 showing the induction coil in a sealing position.

FIG. 3 is a plan view of a coil of the present invention with a source of electrical power attached to the coil.

FIG. 4 is a sectional view of a portion of a container lid showing the layers of plastic and metal.

DESCRIPTION OF THE PREFERRED EMBODIMENT

A container sealing system 10 in which the present invention can be used is shown in FIGS. 1 and 3. System 10 includes a coil assembly 11 having a single turn induction coil 12 with a pair of input leads 16, 17 connected to an electrical power source 18. Coil assembly 11 (FIG. 1) includes coil 12 mounted in a sealing head 22 which is connected to a rod 23 for raising and lowering the sealing head and coil. A pneumatic cylinder 24 having a piston 28 is attached to a fixed beam 29. Compressed air is selectively provided to one of a pair of inputs 30, 31 for raising and lowering piston 28 and coil assembly 11. A lower portion 12a (FIGS. 1, 2) of coil 12 includes a generally conical outer surface 35 for holding a plastic lid 36.

A base 37 (FIGS. 1, 2) includes a generally cylindrical hollow nest 41 with an upper portion having a generally conical inner wall surface 42 of a shape to mate with outer surface 35 of coil 12. A generally cylindrical plastic container 43 is mounted in hollow nest 41 during a sealing operation. Base 37 is mounted on a support platform 47. In a high production sealing system, platform 47 can be a moving conveyor belt which transports containers in a single file into position under sealing head 22.

Plastic lid 36 (FIG. 4) includes an outside layer of plastic 48 and a layer of plastic sealant 49, such as polypropylene, cemented to a metallic layer 50, such as aluminum by a pair of layers of adhesive 53a, 53b. Layer 49 of lid 36 can be secured against a portion of container 43 (FIG. 2) and an electrical current induced into metallic layer 50 which melts sealant layer 48b and melts an adjacent surface 54 (FIG. 2) of container 43 to bond lid 36 to container 43. While metallic layer 50 is shown as a portion of lid 36, layer 50 could be included as a portion of container 43 and an induced electrical current could melt surface 54 of the container and an adjacent portion of lid 36. Another arrangement is to include a metallic layer 50 in both lid 36 and in container 43.

When lid 36 is to be sealed to container 43 (FIG. 1), sealing head 22 and coil 12 are raised by rod 23 so container 43 can be moved directly under sealing head 22. Assembly 11 and lid 36 are lowered until lid 36 is inserted into an upper portion of container 43 (FIG. 2) with a portion of lid 36 and an upper portion of container 43 pressed firmly between outer surface 35 of coil 12 and inner surface 42 of nest 41. An electrical current from source 18 (FIG. 3) is applied to coil 12 causing an induced current to flow in metallic layer 50 (FIG. 4) of lid 36. The induced current melts a portion of inner sealant layer 49 and a portion of the container adjacent to surface 54. The electrical current to coil 12 is terminated and coil 12 briefly holds layer 49 against surface 54 of container 43 while lid 36 and container 43 cool to form a permanent seal. The coil 12 is made of copper which has a high thermal conductivity to provide rapid removal of heat from lid 36 and container 43 so the melted plastic quickly solidifies. The rapid solidifying of the plastic allows high speed operation of sealing system 10.

Thus, the conical base of the induction heating coil holds the lid and container securely together while an electrical current is induced in the metallic layer of the lid. A portion of the lid and a portion of the container are pressed between a conical portion of the coil and a conical portion of a nest wall to conform the shape of the container portion to the shape of the lid portion. The close proximity of the coil to the metallic layer in the lid provides a highly efficient coupling of energy from the coil to the metallic layer, and the copper coil quickly cools the heated lid and container so a high production rate of sealing is obtained.

Although the best mode contemplated for carrying out the present invention has been herein shown and described, it will be apparent that modification and variation may be made without departing from what is regarded to be the subject matter of the invention.

What is claimed is:

1. An induction heating apparatus for providing uniform fusing of a plastic lid with a layer of electrically conductive material to a generally cylindrical plastic container, said apparatus comprising:
- a coil having a generally conical lower portion, said coil having first and second input leads;
- a source of electrical power for selectively supplying an electrical current to said first and said second input leads of said coil;
- means for inducing an electrical current in the layer of electrically conductive material of said plastic lid in response to said electrical current in said coil, said induced current providing heat for a fusing of a plastic lid to a plastic container;
- a generally cylindrical hollow nest for receiving a generally cylindrical container, said nest having a generally conical upper wall portion; and
- means for pressing said coil against said plastic lid to press a portion of said container and a portion of said lid between said conical portion of said coil and said conical wall portion of said nest to conform a portion of said container to a portion of said lid during a fusing operation.

2. An induction heating apparatus as defined in claim 1 including means for providing an electrical current to said coil while a portion of said container and a portion of said lid are pressed between said conical portion of said coil and said conical wall portion of said nest.

3. An induction heating apparatus as defined in claim 1 wherein said coil is made of a metal which conducts heat from said lid and from said container to facilitate solidifying any melted plastic in said lid and in said container when said electrical current is terminated.

4. An induction heating apparatus as defined in claim 1 wherein said layer of electrically conductive material of said lid includes a layer of metallic material, said metallic material developing an induced electrical current in response to said current in said coil, said induced electrical current providing heating of said plastic lid and of said plastic container during said fusing operation.

5. An induction heating apparatus as defined in claim 1 wherein said coil provides a force to form a top portion of said container, provides induction energy for sealing said lid to said container and provides cooling of a heated portion of said lid and said container by the conduction of heat from said lid and said container.

6. An induction heating apparatus as defined in claim 1 wherein said plastic lid includes a generally conical shaped outer edge portion and said lower portion of said coil is shaped to mate with said outer edge portion of said lid.

7. An induction heating apparatus as defined in claim 1 wherein said coil is made of copper to rapidly conduct heat from said lid and from said container to facilitate solidifying any melted plastic in said lid and in said container when said electrical current is terminated.

8. An induction heating apparatus for providing uniform fusing of a plastic lid to a generally cylindrical plastic container including a layer of metallic material in said container, said apparatus comprising:
- a coil having a generally conical lower portion, said coil having first and second input leads;
- a source of electrical power for selectively supplying an electrical current to said first and said second input leads of said coil;
- means for inducing an electrical current in a portion of said metallic material in response to said current in said coil, said induced electrical current in said container providing heating of said container and of said lid during said fusing operation;
- a generally cylindrical hollow nest for receiving a generally cylindrical container, said nest having a generally conical upper wall portion; and
- means for pressing said coil against said plastic lid to press a portion of said container and a portion of said lid between said conical portion of said coil and said conical wall portion of said nest to conform a portion of said container to a portion of said lid during a fusing operation.

9. An induction heating apparatus as defined in claim 8 including a layer of metallic material in said lid, said electrical current in said coil inducing an electrical current in said metallic material in said lid and in said metallic material in said container, said induced electrical currents providing heating of said plastic lid and of said plastic container during said fusing operation.

* * * * *